United States Patent Office 2,738,362
Patented Mar. 13, 1956

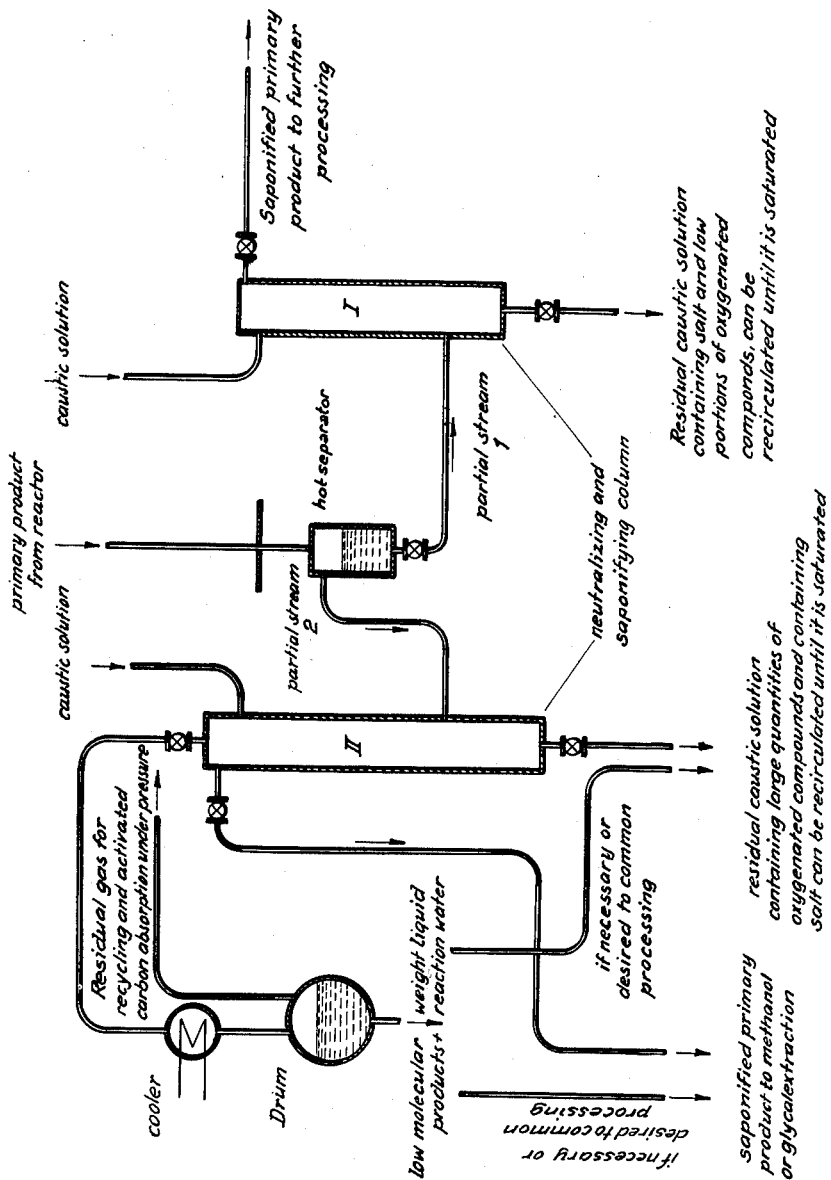

2,738,362

PROCESSING OF PRODUCTS HAVING A HIGH CONTENT OF OXYGENATED COMPOUNDS

Walter Rottig, Oberhausen-Sterkrade-Nord, Germany, assignor to Ruhrchemie Aktiengesellschaft, Oberhausen-Holten, Germany, and Lurgi Gesellschaft fuer Waermetechnik m. b. H., Frankfurt am Main-Heddernheim, Germany, a German corporation Application February 5, 1952, Serial No. 269,921

Claims priority, application Germany February 5, 1951

10 Claims. (Cl. 260—450)

This invention relates to improvements in the processing of products having a high content of oxygenated compounds. It more particularly relates to the processing of primary products of this type, such as are obtained in catalytic carbon monoxide hydrogenation.

The production of primary synthesis products containing about 50% to 60% oxygenated compounds may be obtained in carbon monoxide hydrogenation with the use of suitable iron catalysts and corresponding synthesis conditions. The catalysts and the synthesis conditions, such as, for example, the pressure gas load, gas composition, recycle ratio, etc. which are necessary for obtaining this high yield of oxygenated compounds, are known in the art. These oxygenated compounds are composed of a mixture of different types of compounds. Alcohols constitute about 70% to 85% of this mixture. Noteworthy amounts of aliphatic esters, especially those in the boiling range above about 200° C., are also present. In addition, the mixture contains smaller amounts of ketones, aldehydes, and acids. The saturated and unsaturated aliphatic hydrocarbons, which are always produced by the catalytic hydrogenation of carbon monoxide, are also present in these products.

If these various compounds produced in this type of hydrogenation are to be utilized, their separation must, of course, be effected. For this separation the use of selective extracting agents as, for example, low molecular weight aliphatic alcohols, preferably methanol and its homologues, glycol and its derivatives, nitrobenzene, aniline and other compounds, has been suggested. These selective extracting agents are used for the separation of the oxygenated compounds from the hydrocarbons. If necessary or desirable, small quantities of water may be added to the water-miscible extracting agents in order to increase their selectivity.

In view of the intended commercial application, it is often desirable to obtain as high a yield of alcohols as is possible. The alcohol yield, and preferably that of the valuable higher molecular weight alcohols, may be increased by saponifying the esters present. The esters are mainly present in the higher boiling range, and it has been found that their saponification will mainly result in the production of higher molecular weight alcohols and lower molecular weight acids. The acids produced consist chiefly of acetic acid and propionic acid. $C_4$ to $C_6$ acids are also present in certain quantities. Acids with a carbon number above 6 are present only in very small quantities.

In practice, difficulties were often encountered when the selective extraction method was used for the separation of the total primary synthesis products with a high percentage of oxygenated compounds. The high molecular weight portions and particularly the hydrocarbon portions, are not always dissolved in the primary products and are often in the form of more or less a solid mass at about room temperature. In the presence of larger quantities of extracting agents, as, for example, methanol, the compounds of a somewhat lower molecular weight will cease to be dissolved and will form a flake-like mass. The formation of this flake-like mass from these molecular portions, mainly occurs if water has been added to the extracting agent in order to increase its selectivity. If this use of water is omitted in order to prevent the formation of this flake-like mass, the selectivity of the extracting agent is considerably decreased. With this decrease in selectivity it is impossible to obtain the desired high degree of purity of the alcohols recovered by distillation, due to the presence of larger quantities of hydrocarbons.

These flake-like masses are very troublesome and cause obstructions in the extraction equipment as well in the lines and fittings, etc. If the esters which are present in the primary mixture are saponified prior to the extraction, as is often done in order to increase the yield of alcohols, preferably higher molecular weight alcohols, the formation of a still greater flake-like mass will occur, since these high molecular weight alcohols have a relatively poor solubility in methanol and will remain undissolved in the mixture with the flocculent paraffin. This results in the necessity of a separate processing of this paraffin alcohol mixture.

One object of this invention is a method for the processing of these products with a high content of oxygenated compounds without the above-mentioned difficulties. This, and still further objects, will become apparent from the following description read in conjunction with the drawing which shows a flow sheet of an embodiment of the method in accordance therewith.

In accordance with the invention, these primary products containing oxygenated compounds and especially the products of carbon monoxide hydrogenation with a high content of oxygenated compounds are separated into two partial streams. One of these partial streams which will be referred to hereinafter as "partial stream 1" contains more than 50% and preferably more than 80% of compounds boiling above about 130° to 170° C. and preferably boiling above 140° to 155° C. The other partial stream, which will be referred to hereinafter as "partial stream 2" contains corresponding portions of the compounds boiling below that temperature. Thus, for example, the synthesis products leaving the reactor are separated into partial stream 1 and partial stream 2.

After this separation, the partial streams are separately and independently subjected to a neutralization and saponification. The neutralization and saponification of partial stream 1 is effected with the products contained therein mainly in the liquid phase. The neutralization and saponification of partial stream 2 is effected with the products thereof mainly in the gaseous phase. After the independent neutralization and saponification of partial streams 1 and 2, the saponified products obtained are separately processed.

The new method will be described in detail with reference to the flow sheet. The treatment is described with reference to primary products from catalytic carbon monoxide hydrogenation, though not necessarily limited thereto.

The primary products leaving the synthesis reactor are first passed to a separator which is maintained at a temperature, for example, of about 150° C. This separator is provided, if necessary or desired, with a short column, and is maintained under the same pressure as the synthesis reactor, as, for example, a pressure of 10 atmospheres. The temperature of the separator must be adjusted to the synthesis pressure, and thus, as the synthesis pressure increases, the temperature of the separator must be increased. Temperatures of the separator between 100 and 200° C. are generally sufficient for the process according to the invention. In the separator, the total product separates into two phases. A liquid phase, partial stream 1, collects at the bottom of the separator and is continuously passed to the base of saponifying and neutralizing column I. This column is maintained under pressure. The gaseous phase, partial stream 2, leaves the separator at about 150° C. and enters the base of saponifying and neutralizing column II. This column II also operates under pressure.

Caustic solution is flowed downwardly under pressure through saponifying column I used for partial stream 1. This column is suitably provided with filling bodies or small packings. The column is operated, for example, at about a temperature of 140° to 150° C. at a pressure corresponding approximately to the synthesis pressure. Neutralization of the acids present in partial stream 1 and saponification of the esters present in this stream are effected in this column. This results in the formation of water-soluble salts of the low molecular weight fatty acids which are withdrawn at the bottom of the column. The liquid mixture consisting of hydrocarbons and alcohols and small residual quantities of aldehydes and ketones, is drawn off at the top. The processing of the two streams of products leaving column I is effected in the known conventional manner.

Partial stream 2 leaving the separator at 150° C. in the gaseous state is introduced into the base of the second saponifying column II. A caustic solution is flowed downwardly from the top of column II counter-current to partial stream 2. The caustic solution saponifies the esters present in small amounts and neutralizes the free acid. The column, for example, is operated at temperatures between about 100° and 150° C., and at synthesis pressure, preferably of about 10 to 20 atmospheres. A layer accumulates at the bottom of the column which consists of water with larger quantities of water-soluble, low molecular weight compounds, consisting principally of alcohols and also containing ketones and aldehydes as well as salts of the fatty acids formed by the neutralization and ester saponification. A mixture of liquid organic compounds consisting of hydrocarbons, alcohols, etc., is continuously drawn off the top of saponifying column II. A residual gas stream consisting of unreacted carbon monoxide and hydrogen containing carbon dioxide, methane and nitrogen as well as low molecular weight hydrocarbons and organic compounds is simultaneously withdrawn at the top of saponifying column II. This gas stream is passed through a water cooler and then through a pressure drum. When effecting the synthesis with a gas recycling, this recycled gas is utilized from the pressure drum. After being released from pressure, the liquid content of the pressure drum is passed to a normal pressure drum, while the residual gas is passed through an activated carbon adsorber operating under pressure or through an oil scrubbing unit. The oil layer on top of the neutralizing solution of saponifying column II, is also cooled and released from pressure. The resulting hydrocarbons which are gaseous under normal conditions, are collected in an activated carbon adsorber or an oil scrubbing unit. In certain cases when the ester content of this product is high, it must be subjected to a continuous after treatment with a caustic solution in a third column.

The caustic solution used for the neutralization and saponification in columns I and II, consists in general of aqueous solutions of the hydroxides or carbonates of the alkalis, and in some cases of the alkaline earths. Their concentration is generally between 2% and 50%, preferably about 5% to 20%. It is possible to recycle the solution with the addition of certain quantities of fresh solution, if necessary. In some cases, an alcoholic solution, as, for example, methanol or ethanol, may be passed through saponifying column II and through the additional saponifying column which may be used if the oil layer from saponifying column II has a high ester content. This alcoholic solution under certain circumstances has the advantage of simultaneously extracting the oxygenated compounds from the mixture of oxygenated compounds and hydrocarbons.

The processing of the water-alcohol mixture obtained at the bottoms of columns I and II and of the third saponifying column if necessary, is effected by simply distilling off the oxygenated compounds dissolved in the aqueous phase. The salts of the aliphatic monocarboxylic acids may be recovered by evaporation. It is also possible to effect separation, for example, with sulfuric acid, which will result in organic fatty acids having carbon numbers between 2 and 6.

The separation of the overhead product leaving column I into hydrocarbons and alcohols is effected in the known and conventional manner.

Alcohols or ketones having a carbon number of $C_3$ to $C_5$ or mixtures thereof containing, if necessary or desired, up to 5% water may be used with particular advantage as extracting agents in the separation by extraction. The selectivity of these extracting agents is at least as good as that of methanol, and the dissolving power for the alcohols to be extracted is considerably higher. The extracting method is effected in the conventional manner. Both continuous and batch-wise operations may be used. The processing of the extract is effected in the manner well known in the art.

The processing of the overhead product of partial stream 1 may often be effected with particular advantage in such a manner as to convert the alcohols present by means of low boiling aldehydes into acetals as is set forth in U. S. application Serial No. 215,009. The acetals, with the use of the above-mentioned extracting agents, may be separated from the hydrocarbons also present in the mixture.

The processing of the liquid organic products from column II and from a third saponifying column if the same is used, is likewise effected in the conventional manner as described above. In this case the use of methanol and its homologues as well as glycol and its homologues, frequently with the addition of small quantities of water for the extraction, have been found to be of particular advantage. Mixtures of monovalent and polyvalent alcohols are often of advantage in specific cases.

The nature of the products to be separated determines whether the extraction is to be effected at elevated temperatures and at elevated pressures.

Though the method of operation has been described in detail, with reference to the treatment of mixtures obtained in carbon monoxide hydrogenation, it is, of course, not limited to such mixtures, but may also be used in an analogous manner to mixtures derived from any other source, as, for example, the so-called Oxo-synthesis or combinations thereof with the primary synthesis, etc. The aqueous or aqueous alcoholic solutions are processed in the conventional manner by way of distillation or extraction.

The following example is given as illustrative but not limitative of the method in accordance with the invention:

*Example*

Water gas was passed at a temperature of 214° C. and a synthesis pressure of 10 atmospheres with a gas load of 150 liters per liter of catalyst per hour over an iron catalyst consisting of 100 parts Fe, 5 parts Cu, 10 parts CaO and 8.1 parts of soda, calculated at $K_2O$. The catalyst had been prepared by precipitating the corresponding nitrates with a hot soda solution at a pH value of 9.2, followed by a partial washing. 2.5 volumes of the residual gas leaving the synthesis reactor per volume of fresh gas were recycled into the process. The $CO+H_2$ conversion was 59%.

An analysis of the resulting primary product determined that the fraction boiling between 30 and 200° C. contained about 55% of alcohols in addition to small amounts of other oxygenated compounds, as well as olefinic and paraffinic hydrocarbons. The fraction boiling between 200° and 320° C. was found to contain 40% of alcohols and 4% of esters in addition to small quantities of aliphatic ketones and acids and hydrocarbons. The fraction boiling above 320° C. contained 20% of esters in addition to 5% of alcohols, the balance consisting of hydrocarbons.

The processing of the resulting reaction water by distillation yielded 28% of alcohols, chiefly ethyl alcohol, in addition to certain amounts of propyl, butyl and small quantities of methyl alcohol. Moreover, approximately 5% of acids, chiefly acetic acid, and small quantities of ketones and aldehydes were contained in the reaction water.

After having left the synthesis reactor, this primary product was passed through a separator maintained at a temperature of 150° C. Here a liquid phase formed (partial stream 1), the other products leaving the separator in the gaseous state (partial stream 2). Approximately 8% of the synthesis products boiling about 320° C. were contained in the liquid partial stream 1 in addition to approximately 3.5% of the products boiling between 200° and 320° C. and 1.0% of the products boiling between 100 and 200° C. The quantity of this partial stream, calculated on the total non-aqueous synthesis product, is approximately between 10 and 40%.

This product was continuously saponified in saponifying column I, using a pressure of 8 atmospheres, which permitted the transport of the product from the liquid separator to the saponifying column to be effected by the differential pressure of 2 atmospheres. The saponifying agent was a 15% caustic solution conducted in downward direction countercurrently to the primary mixture being saponified. Moreover, small quantities of free acid present in partial stream 1 were neutralized in this column. The solution was recycled while continuously adding small quantities of fresh solution and withdrawing corresponding quantities of spent solution at the bottom of the column.

The saponified overhead product of saponifying column I was subsequently cooled and released from pressure. Only alcohols and hydrocarbons in addition to small amounts of ketones and aldehydes were contained therein. The alcohols were separated from the other organic compounds by acetalization, using propionic aldehyde and smaller quantities of hydrochloric acid as the condensing agents. Then the acetals formed were extracted from the other compounds by means of propanol. Excess propionic aldehyde and propanol were distilled from the propanol extract, followed by reconverting the remaining acetal mixture into alcohols and propionic aldehyde by means of water with the addition of small quantities of concentrated hydrochloric acid. The propionic aldehyde was continuously distilled off. In the subsequent processing of the remaining alcohols by distillation a degree of purity of 97% to 98% was obtained.

The product mixture going off with the residual gas from the high temperature separator (partial stream 2) consisted of 63.5 parts boiling between 30° and 200° C., 22 parts boiling between 200° and 320° C., and 2 parts boiling above 320° C. In addition, it contained the reaction water, the water-soluble oxygenated compounds and the hydrocarbons gaseous under normal conditions. This total mixture was introduced to the bottom of the second saponifying or neutralizing column II through which it was passed in upward direction while a 15% soda solution was passed in countercurrent to the product to neutralize the free acids present in larger amounts and smaller quantities of esters. The aqueous phase was continuously withdrawn at the bottom of the column and partially recycled into the column with the addition of small quantities of fresh solution. The other part of the aqueous phase drawn off was processed by distillation in the conventional manner to recover the oxygenated compounds contained therein.

The oily phase which formed at the top of the saponifying column was continuously passed into a separator, while the residual gas and the gaseous organic compounds were conducted, after cooling, into a drum. Here, all organic compounds liquid at room temperature and small amounts of water separated. The gaseous hydrocarbons and the unreacted $CO+H_2$ were partially returned as recycle gas into the reactor, while the remainder was passed through an activated carbon absorber operating under pressure, in which small quantities of oxygenated compounds and all the hydrocarbons which are gaseous under normal conditions were recovered.

The overhead product of column II and the product from the low temperature separator were processed in the conventional manner by extraction with methanol in a six-stage unit with the addition of small quantities of water to each stage. The methanol extract contained practically all of the oxygenated compounds, chiefly alcohols, in addition to small quantities of ketones and aldehydes. The extracted hydrocarbon mixture was practically free from oxygenated compounds. In the processing of the methanol extract by distillation, the extracted alcohols were recovered with a high degree of purity. The analytical characteristics indicate a 96% to 99% purity.

Though the various treatment steps have been described with reference to specific modes for the effecting thereof, as, for example, the use of neutralizing, saponifying columns, these steps may be effected in any known or conventional manner without departing from the spirit of the invention, which I have endeavored to generically claim.

I claim:

1. In the method for the processing of organic products having a high content of oxygenated compounds including oxygenated compounds boiling above and oxygenated compounds boiling below 130° to 170° C. from a synthesis process operated under elevated conditions of temperature and pressure, the improvement which comprises separating, at a pressure substantially corresponding to the pressure of the synthesis process and at an elevated temperature adapted to maintain more than 50% of the compounds boiling above 130° to 170° C. in liquid phase, the total product into partial stream 1 containing more than 50% of compounds contained in the total product boiling above about 130° to 170° C. and partial stream 2 containing the compounds boiling below said temperature, neutralizing and saponifying the products of partial stream 1 under pressure in excess of atmospheric substantially in the liquid phase, and independently neutralizing and saponifying the products of partial stream 2 under pressure in excess of atmospheric substantially in the gaseous phase.

2. Improvement according to claim 1, in which partial stream 1 contains in excess of 80% of the compounds boiling above about 130° to 170° C.

3. Improvement according to claim 2, in which partial stream 1 contains more than 80% of compounds boiling above about 140° to 155° C.

4. Improvement according to claim 1, in which said saponification of at least one of partial stream 1 and partial stream 2 is effected at a pressure of about 5 to 50 kg. per square centimeter at a temperature of about 120° to 170° C.

5. Improvement according to claim 4, in which said saponification of at least one of partial stream 1 and partial stream 2 is effected at a pressure of about 10 to 30 kg. per square centimeter at a temperature of about 130° to 150° C.

6. Improvement according to claim 1, which includes extracting the saponification products of partial stream 1 with an extracting agent selected from the group consisting of alcohols and ketones having 3 to 5 carbon atoms.

7. Improvement according to claim 6, in which said extracting agent contains water present in an amount not in excess of 5%.

8. Improvement according to claim 1, which includes converting the alcohols present in partial stream 1 into acetals with low boiling aldehydes and separating the acetals formed from the hydrocarbons present in the mixture by means of an extracting agent.

9. Improvement according to claim 8, in which said extracting agent is an extracting agent having 3 to 5 carbon atoms selected from the group consisting of alcohols and ketones.

10. Improvement according to claim 9, in which said extracting agent contains water present in an amount not in excess of 5%.

References Cited in the file of this patent

UNITED STATES PATENTS

| | | |
|---|---|---|
| 2,568,717 | Burton et al. | Sept. 25, 1951 |
| 2,571,151 | McGrath et al. | Oct. 16, 1951 |
| 2,614,115 | Catterall et al. | Oct. 14, 1952 |
| 2,635,111 | McGrath et al. | Apr. 14, 1953 |

OTHER REFERENCES

Cromeans: Abstract published November 20, 1951, at pages 891 and 892 in O. G. vol. 652. "Formation of Acetals To Separate Oxygenated Compounds From Fischer-Tropsch Products."